United States Patent
O'Connor et al.

(10) Patent No.: US 7,600,084 B1
(45) Date of Patent: *Oct. 6, 2009

(54) REGISTER FILE WITH INTEGRATED ROUTING TO EXECUTION UNITS FOR MULTI-THREADED PROCESSORS

(75) Inventors: Dennis M. O'Connor, Chandler, AZ (US); Lawrence T. Clark, Phoenix, AZ (US)

(73) Assignee: Marvell International Ltd., Hamilton (BM)

( * ) Notice: Subject to any disclaimer, the term of this patent is extended or adjusted under 35 U.S.C. 154(b) by 0 days.

This patent is subject to a terminal disclaimer.

(21) Appl. No.: 11/956,144

(22) Filed: Dec. 13, 2007

Related U.S. Application Data

(63) Continuation of application No. 10/388,384, filed on Mar. 11, 2003, now Pat. No. 7,310,710.

(51) Int. Cl.
*G06F 12/00* (2006.01)

(52) U.S. Cl. .................. 711/154; 711/156; 718/108

(58) Field of Classification Search .................. 711/108, 711/102, 103, 154, 156, 145, 203; 712/220, 712/245, 228, 219; 718/106, 107, 108
See application file for complete search history.

(56) References Cited

U.S. PATENT DOCUMENTS

| | | | |
|---|---|---|---|
| 5,928,356 A | 7/1999 | Golliver et al. | |
| 6,223,208 B1 | 4/2001 | Kiefer et al. | |
| 6,298,431 B1 | 10/2001 | Gottlieb | |
| 6,341,347 B1* | 1/2002 | Joy et al. | 712/228 |
| 6,343,348 B1 | 1/2002 | Tremblay et al. | |
| 6,408,325 B1 | 6/2002 | Shaylor | |
| 6,507,862 B1 | 1/2003 | Joy et al. | |
| 6,694,347 B2 | 2/2004 | Joy et al. | |

OTHER PUBLICATIONS

Tremblay et al., "A Three Dimensional Register File For Superscalar Processors", Jan. 1995, pp. 191-201, Proceedings of the 28th Annual Hawaii International Conference on Systems Sciences.*

* cited by examiner

*Primary Examiner*—Pierre-Michel Bataille

(57) ABSTRACT

A multi-context register file for use in a multi-threaded processor includes at least one multi-context register file cell having internal routing functionality.

26 Claims, 5 Drawing Sheets

REGISTER FILE WITH INTEGRATED ROUTING TO EXECUTION UNITS FOR MULTI-THREADED PROCESSORS

RELATED APPLICATION DATA

The present application is a continuation of U.S. patent application Ser. No. 10/388,384, filed Mar. 11, 2003, and entitled "REGISTER FILE WITH INTEGRATED ROUTING TO EXECUTION UNITS FOR MULTI-THREADED PROCESSORS," which is hereby incorporated by reference herein in its entirety.

TECHNICAL FIELD

The invention relates generally to register files and, in some embodiments, to register files for use in multi-threaded processors.

DETAILED DESCRIPTION

Figure 1:
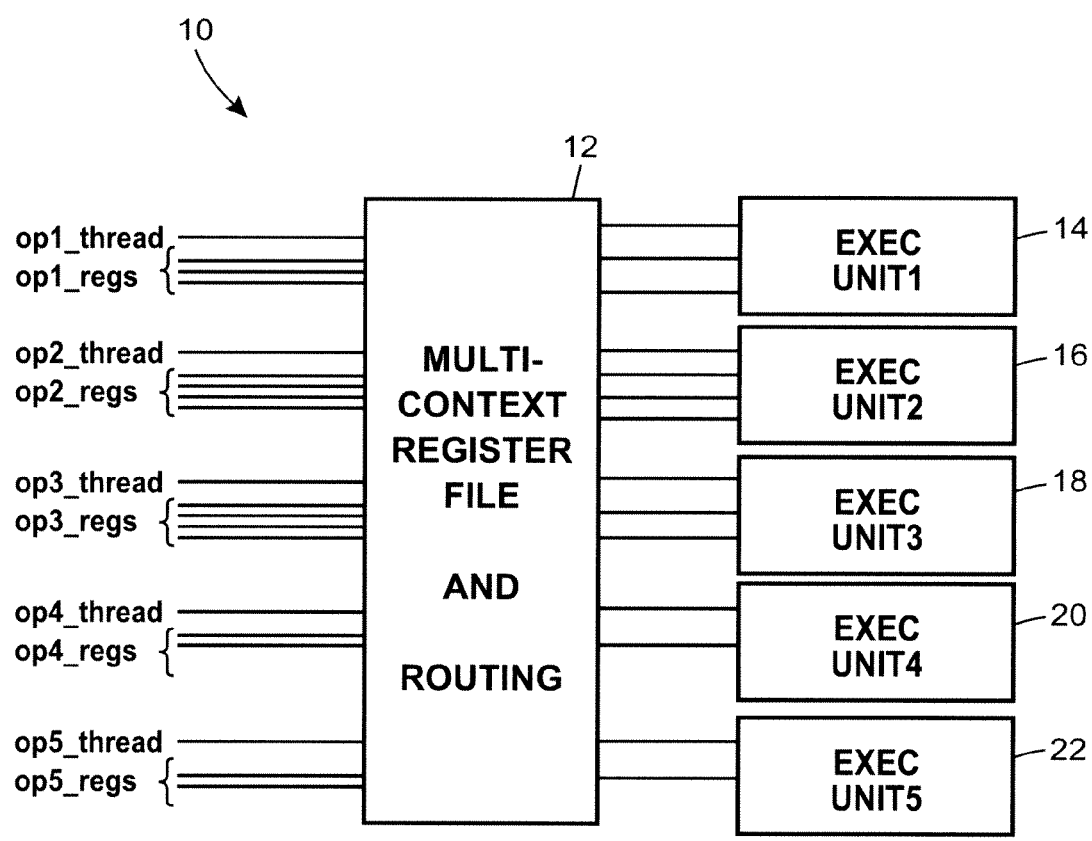
FIG. 1 is a block diagram illustrating an example multi-threaded processing arrangement in accordance with an embodiment of the present invention.

In the following detailed description, reference is made to the accompanying drawings that show, by way of illustration, specific embodiments in which the invention may be practiced. These embodiments are described in sufficient detail to enable those skilled in the art to practice the invention. It is to be understood that the various embodiments of the invention, although different, are not necessarily mutually exclusive. For example, a particular feature, structure, or characteristic described herein in connection with one embodiment may be implemented within other embodiments without departing from the spirit and scope of the invention. In addition, it is to be understood that the location or arrangement of individual elements within each disclosed embodiment may be modified without departing from the spirit and scope of the invention. The following detailed description is, therefore, not to be taken in a limiting sense, and the scope of the present invention is defined only by the appended claims, appropriately interpreted, along with the full range of equivalents to which the claims are entitled. In the drawings, like numerals refer to the same or similar functionality throughout the several views.

FIG. 1 is a block diagram illustrating an example multi-threaded processing arrangement 10 in accordance with an embodiment of the present invention. The multi-threaded processing arrangement 10 may be part of, for example, a microprocessor or other digital processing device. As illustrated, a multi-context register file 12 having internal routing functionality may be coupled to any one or more of a number of execution units 14, 16, 18, 20, 22. According to one example implementation, one or more of the execution units 14, 16, 18, 20, 22 may be individual functional units within a processor that perform a predetermined processing function upon operands received at corresponding input terminals, although the invention is not limited in this respect. The execution units 14, 16, 18, 20, 22 may include, for example, one or more adders, load/store units, multiplication units, division units, and/or other structures. The multi-context register file 12 may also be coupled to a plurality of context registers (i.e., op1_regs, op2_regs, etc.) from which data relating to a plurality of different active threads may be received. The multi-context register file 12 is capable of storing and directing data from the context registers to corresponding inputs of the execution units 14, 16, 18, 20, 22. In at least one embodiment, the multi-context register file 12 may deliver operands corresponding to different processing threads to different execution units for simultaneous processing.

Figure 2:
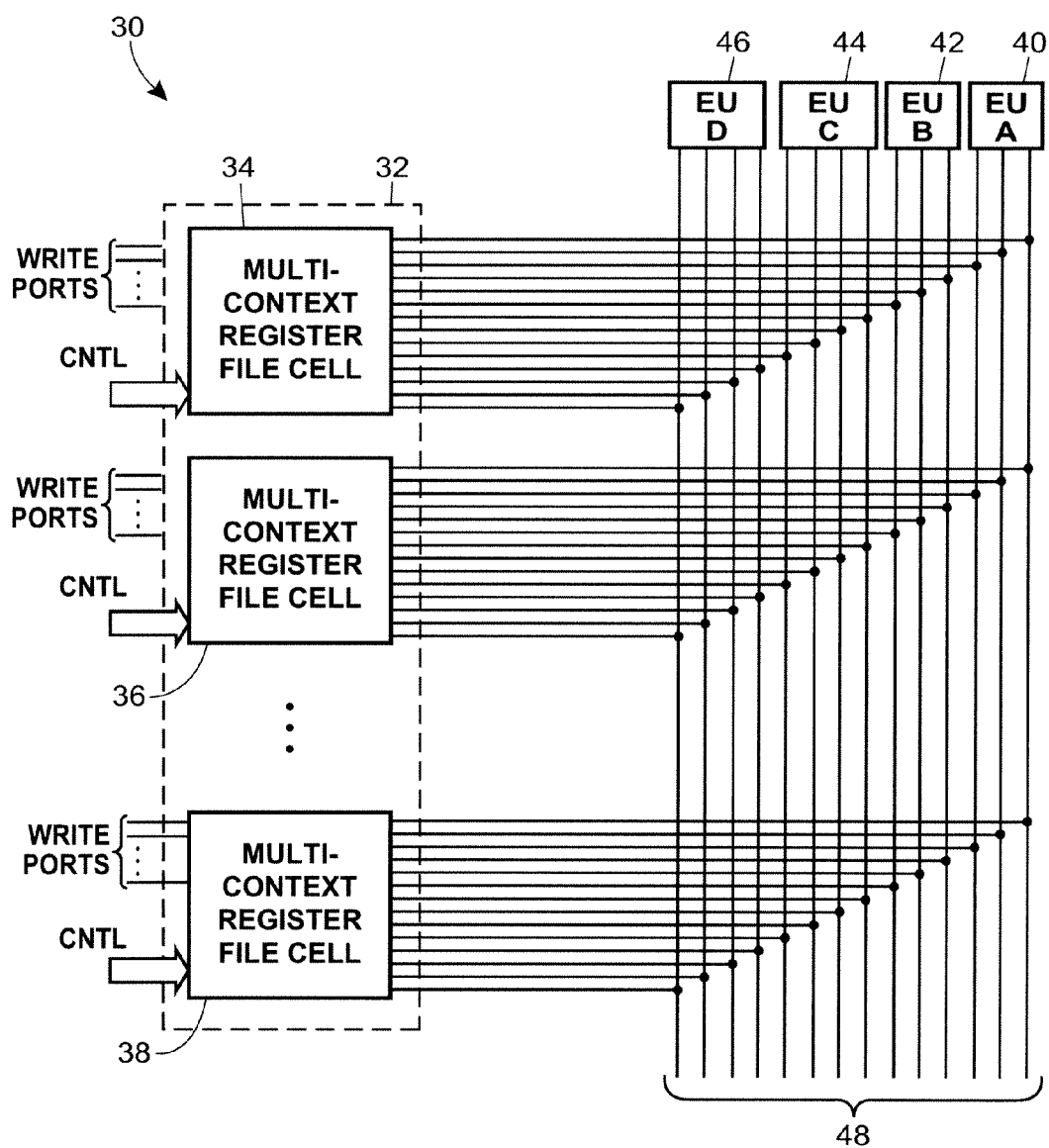
FIG. 2 is a block diagram illustrating an example multi-threaded processing arrangement in accordance with another embodiment of the present invention.

FIG. 2 is a block diagram illustrating an example multi-threaded processing arrangement 30 in accordance with an embodiment of the present invention. The arrangement 30 may include one or more of a multi-context register file 32 having a plurality of individual multi-context register file cells 34, 36, 38. In accordance with one example implementation, the multi-context register file 32 may be coupled to any of a number of execution units 40, 42, 44, 46 through, e.g., a transmission structure 48, although the invention is not limited in this respect. Although illustrated with four execution units, it should be appreciated that the number of execution units may vary from implementation to implementation. At least one of the multi-context register file cells 34, 36, 38 includes data storage space for storing data corresponding to multiple processing threads. In at least one approach, the multi-context register file cells 34, 36, 38 may store one bit of data for each context in the processor. The multi-context register file cells 34, 36, 38 may also include routing functionality capable of routing data bits stored in the cell to corresponding inputs of the execution units 40, 42, 44, 46. The multi-context register file cells 34, 36, 38 include a number of write ports through which write data may be received. As illustrated, the multi-context register file cells 34, 36, 38 may also receive control information to control both the writing of data into the cell and the routing of data to the execution units 40, 42, 44, 46.

In at least one embodiment, the number of multi-context register file cells 34, 36, 38 within the multi-context register file 32 is equal to a number of stored bits in a corresponding context (although many alternate embodiments also exist). For example, in a system where there are 31 32-bit registers per context, there may be 31×32=992 multi-context register file cells 34, 36, 38 within the multi-context register file 32. As described above, in at least one approach, the cells may store one data bit for each context. Many alternative arrangements also exist. In at least one embodiment of the invention, a computer is provided that includes a microprocessor having a multi-context register file (such as register file 32 of FIG. 2) in communication with a flash memory for performing corresponding data storage functions. Alternative or additional forms of memory may also be used.

Figure 3:
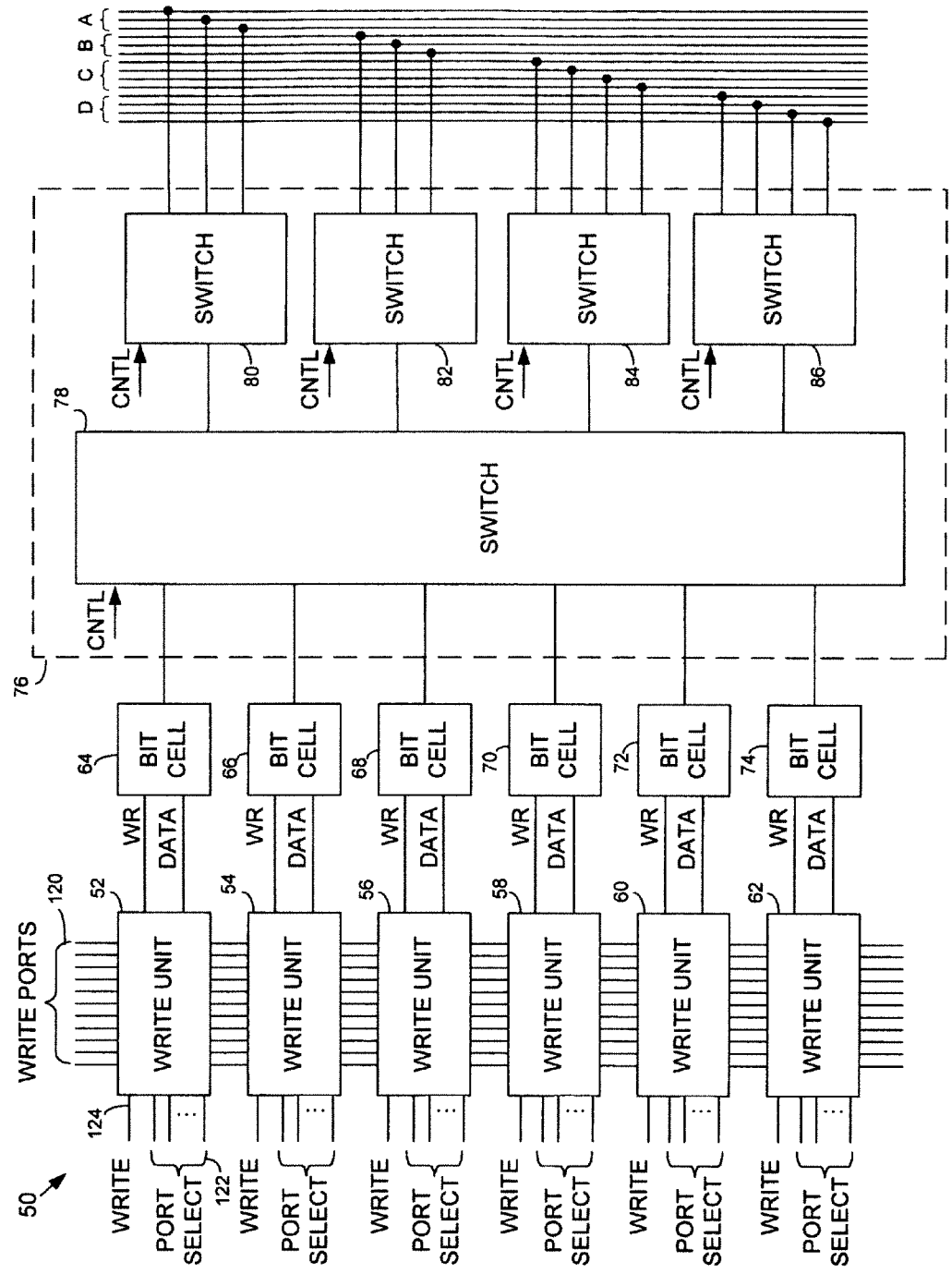
FIG. 3 is a block diagram illustrating an example multi-context register file cell in accordance with an embodiment of the present invention.

FIG. 3 is a block diagram illustrating an example multi-context register file cell 25 in accordance with an embodiment of the present invention. The multi-context register file cell 50 may be used, for example, within the multi-context register file 32 of FIG. 2. Other applications also exist. As illustrated in FIG. 3, the multi-context register file cell 50 may include one or more of a number of write units 52, 54, 56, 58, 60, 62, a number of bit cells 64, 66, 68, 70, 72, 74, and a router 76, although the invention is not limited in this respect. According to one example implementation, each of the write units 52, 54, 56, 58, 60, 62 corresponds to one processing thread (and one context) of the processor and is operative for writing a bit of data for that context to a corresponding one of the bit cells 64, 66, 68, 70, 72, 74. In at least one implementation, a write unit 52, 54, 56, 58, 60, 62 and its corresponding bit cell 64, 66, 68, 70, 72, 74 within the register file cell 50 corresponds to the same bit within the same register of the associated context (e.g., bit 3 of register 2 in each of the contexts). The router 76 is operative for controllably routing selected data bits stored in the bit cells 64, 66, 68, 70, 72, 74 to corresponding execution unit inputs. For example, the router 76 can be used to deliver the bit stored in bit cell 72 to the first input of functional unit D by applying the appropriate control data to the router 76. The control data can be generated by, for example, the processor core within the corresponding processor.

As illustrated in FIG. 3, a write unit 52, 54, 56, 58, 60, 62 may include a number of write ports 120 through which data can be received from, for example, the corresponding context registers. A write unit 52, 54, 56, 58, 60, 62 may also include a port select 122 for use in selecting the port carrying the data bit to be written to the corresponding bit cell. A write unit 52, 54, 56, 58, 60, 62 may also include a write line 124 through which a write command may be received that instructs the write unit to write the bit on the selected write port to the corresponding bit cell. The port select and write commands may be received from, for example, the processor core within the corresponding processor.

In the embodiment of FIG. 3, the router 76 may include a primary switch 78 and four secondary switches 80, 82, 84, 86 for performing the routing function of the multi-context register file cell 50. Each of the secondary switches 80, 82, 84, 86 in the router 76 may correspond to one of the execution units (A, B, C, D) that perform processing functions in the processor. In the illustrated embodiment, the secondary switches 80, 82, 84, 86 each have a number of outputs that equals the number of input operands required by a corresponding execution unit (A, B, C, D). The primary switch 78 is connected to an output of each of the bit cells 64, 66, 68, 70, 72, 74 within the multi-context register file cell 50 and is capable of controllably coupling the output of selected bit cells to any of the secondary switches 80, 82, 84, 86 in response to control information. Thus, the primary switch 78 can couple the output of bit cell 64 (corresponding to a first context) to, for example, secondary switch 84 in response to control information. At the same time (or another time), the primary switch 78 may couple the output of bit cell 66 (corresponding to a second context) to, for example, secondary switch 80 in response to control information, and so on. Each of the secondary switches 80, 82, 84, 86 can controllably couple a bit of data at an input thereof to one or more of the inputs of the corresponding execution unit (i.e., execution units A, B, C, D, respectively) in response to control information. In this manner, any one of the data bits stored in the bit cells 64, 66, 68, 70, 72, 74 can be directed to any one (or more) of the inputs of the execution units (A, B, C, D) by appropriately controlling the switches 78, 80, 82, 84, 86 within the router 76. A similar routing scenario may exist in other register file cells of a multi-context register file. It should be appreciated that many alternative routing structures and techniques may be implemented within a multi-context register file cell in accordance with the present invention. The number of contexts handled within each multi-context register file cell and the number of execution units that are used may vary.

Figure 4:
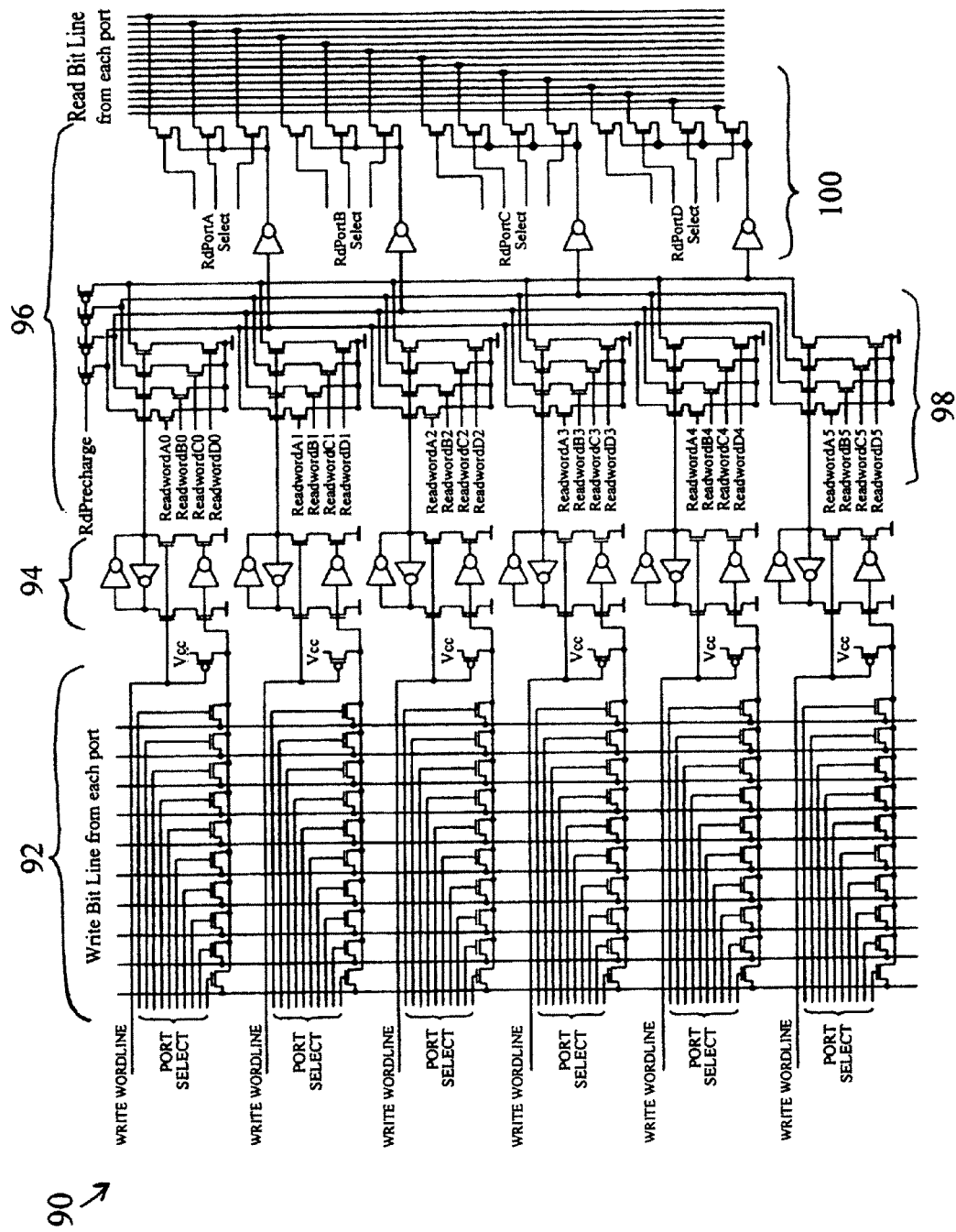
FIG. 4 is a schematic diagram illustrating an example multi-context register file cell in accordance with another embodiment of the present invention.

FIG. 4 is a schematic diagram illustrating an example multi-context register file cell 90 in accordance with an embodiment of the present invention. The multi-context register file cell 90 of FIG. 4 represents one possible circuit implementation of the cell of FIG. 3. Many alternative circuit implementations also exist. As illustrated, the multi-context register file cell 90 includes a plurality of write units 92, a corresponding plurality of storage cells 94, and a router 96. Each of the write units in the plurality of write units 92 is operative for selecting a write bit for storage in a corresponding storage cell based on corresponding port select information. Each of the write units is coupled to a write wordline through which a write command may be received instructing the write unit to write the selected bit into the corresponding storage cell.

In the embodiment of FIG. 4, the router 96 includes a first stage 98 and a second stage 100. The second stage 100 includes four individual switches that are each capable of directing an input bit to one or more of the inputs of a corresponding functional unit in response to control information (e.g., RdPortA Select, RdPortB Select, etc. in the illustrated embodiment). The first stage 98 of the router 96 acts as a switch allowing the data bit stored in any one of the plurality of storage cells 94 to be delivered to the input of any one of the switches of the second stage 100 in response to control information (e.g., ReadWordA0, ReadWordB0, ReadWordC0, ReadWordD0, etc. in the illustrated embodiment). The first stage 98 may deliver up to four bits from the storage cells 94 to the second stage 100 at one time.

Figure 5:
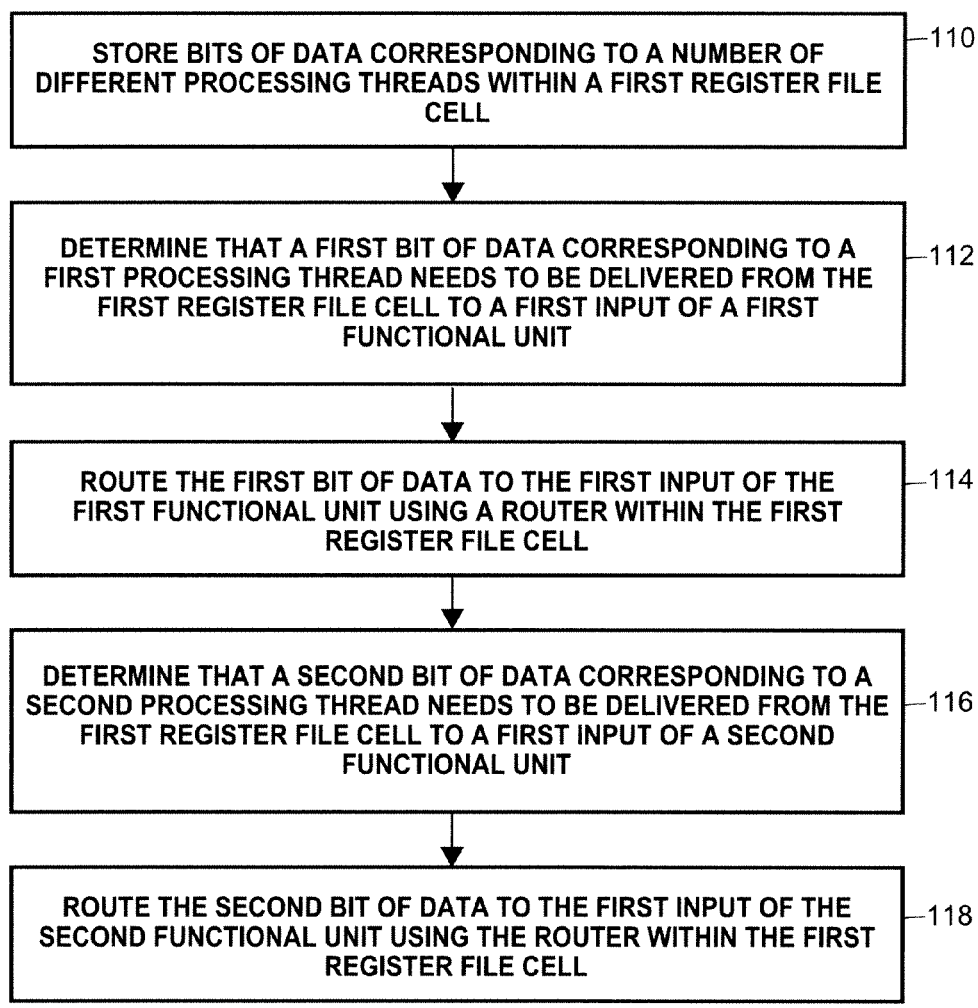
FIG. 5 is a flowchart illustrating an example method in accordance with an embodiment of the present invention.

FIG. 5 is a flowchart illustrating an example method in accordance with an embodiment of the present invention. Bits of data corresponding to a number of different processing threads are stored within a first register file cell (block 110). The bits of data may include, for example, one bit of data (or multiple bits of data) from each of a predetermined number of threads. Each bit of data may be transferred from context registers associated with the corresponding processing thread. A determination is made that a first bit of data corresponding to a first processing thread needs to be delivered from the first register file cell to a first input of a first functional unit within a processing system (block 112). The first bit of data is then routed to the first input of the first functional unit using a router within the first register file cell (block 114). A determination may also be made that a second bit of data corresponding to a second processing thread needs to be delivered from the first register file cell to a first input of a second functional unit within the processing system (block 116). The second bit of data is then routed to the first input of the second functional unit using the router within the first register file cell (block 118). The second bit of data may be routed to the first input of the second functional unit at substantially the same time that the first bit of data is routed to the first input of the first functional unit by the router.

In the foregoing detailed description, various features of the invention are grouped together in one or more individual embodiments for the purpose of streamlining the disclosure. This method of disclosure is not to be interpreted as reflecting an intention that the claimed invention requires more features than are expressly recited in each claim. Rather, as the following claims reflect, inventive aspects may lie in less than all features of each disclosed embodiment. Thus, the following claims are hereby incorporated into the detailed description, with each claim standing on its own as a separate embodiment of the invention.

Although the present invention has been described in conjunction with certain embodiments, it is to be understood that modifications and variations may be resorted to without departing from the spirit and scope of the invention as those skilled in the art readily understand. Such modifications and variations are considered to be within the purview and scope of the invention and the appended claims.

We claim:

1. A multi-context register file comprising:
   a first register file cell including:
      a plurality of storage cells to store data corresponding to a plurality of processing threads, the plurality of storage cells including:
         a first storage cell to store a portion of a first operand of an instruction of a first processing thread; and
         a second storage cell to store a portion of a second operand of an instruction of a second processing thread; and
      wherein the first register file cell further includes a first router in communication with the plurality of storage cells to couple a selected storage cell of the first register file cell to an input of a selected functional unit in response to control information.

2. A multi-context register file according to claim 1, further comprising at least a second register file cell, the second register file cell including:
   a plurality of other storage cells to store data corresponding to the plurality of processing threads, the plurality of other storage cells including:
      a first storage cell to store another portion of the first operand of the instruction of the first processing thread; and
      a second storage cell to store another portion of the second operand of the instruction of the second processing thread; and
   wherein the second register file cell further includes a second router in communication with the plurality of other storage cells to couple a selected storage cell of the second register file cell to a selected functional unit in response to control information.

3. A multi-context register file according to claim 2, wherein the first router of the first register file cell and the second router of the second register file cell route separate portions of an operand to an input of the selected function unit.

4. A multi-context register file according to claim 1, wherein the selected functional unit includes a plurality of inputs;
   wherein the first router of the first register file cell couples the selected storage cell of the first register file cell to a selected input of the selected functional unit in response to control information.

5. A multi-context register file according to claim 1, wherein the first register file cell further comprises:
   a write unit coupled to the first storage cell to write the portion of the first operand from a selected write port to the first storage cell in response to control information.

6. A multi-context register file according to claim 1, wherein each of the plurality of storage cells of the first register file cell is used to store a single bit of an operand.

7. A multi-context register file according to claim 1, wherein the first router of the first register file cell includes a first stage and a second stage;
   wherein the first stage couples the selected storage cell of the first register file cell to a selected input of a plurality of inputs of the second stage; and
   wherein the second stage couples the selected input of the second stage to the input of the selected functional unit.

8. A multi-context register file according to claim 7, wherein the first stage includes a primary switch;
   wherein the second stage includes a plurality of secondary switches; and
   wherein the primary switch couples the selected storage cell of the first register file cell to a selected secondary switch.

9. A multi-context register file according to claim 8, wherein the plurality of secondary switches includes at least one secondary switch corresponding to a first functional unit and at least one secondary switch corresponding to a second functional unit.

10. A multi-context register file according to claim 1, wherein the first router of the first register file cell couples a first selected storage cell of the first register file cell to an input of a first selected functional unit and couples a second selected storage cell of the first register file cell to an input of a second selected functional unit at substantially the same time in response to control information.

11. A microprocessor comprising:
    a plurality of functional units to perform predetermined processing functions, each functional unit including one or more inputs to receive operands; and
    a multi-context register file having a plurality of register file cells, the plurality of register file cells including a first register file cell, the first register file cell comprising:
       a plurality of storage cells to store data corresponding to a plurality of processing threads, the plurality of storage cells including:
          a first storage cell to store a portion of a first operand of an instruction of a first processing thread; and
          a second storage cell to store a portion of a second operand of an instruction of a second processing thread; and
       wherein the first register file cell further includes a first router in communication with the plurality of storage cells and the plurality of functional units to couple a selected storage cell of the first register file cell to an input of a selected functional unit in response to control information.

12. A microprocessor according to claim 11, wherein the plurality of register file cells includes a second register file cell, the second register file cell comprising:
    a plurality of other storage cells to store data corresponding to the plurality of processing threads, the plurality of other storage cells including:
       a first storage cell to store another portion of the first operand of the instruction of the first processing thread; and
       a second storage cell to store another portion of the second operand of the instruction of the second processing thread; and
    wherein the second register file cell further includes a second router in communication with the plurality of other storage cells to couple a selected storage cell of the second register file cell to a selected functional unit in response to control information.

13. A microprocessor according to claim 12, wherein the first router of the first register file cell and the second router of the second register file cell route separate portions of an operand to an input of the selected function unit.

14. A microprocessor according to claim 11, wherein the selected functional unit includes a plurality of inputs;
    wherein the first router of the first register file cell couples the selected storage cell to a selected input of the selected functional unit in response to control information.

15. A microprocessor according to claim 11, wherein the first register file cell comprises a write unit coupled to the first storage cell to write the portion of the first operand from a selected write port to the first storage cell in response to control information.

16. A microprocessor according to claim 11, wherein each of the plurality of storage cells of the first register file cell is used to store a corresponding single bit of a different operand.

17. A microprocessor according to claim 11, wherein the first router of the first register file cell includes a first stage and a second stage;
wherein the first stage couples the selected storage cell of the first register file cell to a selected input of a plurality of inputs of the second stage; and
wherein the second stage couples the selected input of the second stage to the input of the selected functional unit.

18. A computer comprising:
a microprocessor; and
a flash memory in communication with the microprocessor to perform data storage functions in association therewith;
wherein the microprocessor includes:
a plurality of functional units to perform predetermined processing functions, each functional unit including one or more inputs to receive operands; and
a multi-context register file having a plurality of register file cells, the plurality of register file cells including a first register file cell, the first register file cell comprising:
a plurality of storage cells to store data corresponding to a plurality of processing threads, the plurality of storage cells including a first storage cell to store a portion of a first operand of an instruction of a first processing thread and a second storage cell to store a portion of a second operand of an instruction of a second processing thread; and
a router in communication with the plurality of storage cells and the plurality of functional units to couple a selected storage cell of the first register file cell to an input of a selected functional unit in response to control information.

19. A method comprising:
storing respective portions of operands of respective instructions of a plurality of processing threads within respective storage cells of a first register file cell;
determining that a portion of a first operand of an instruction of a first processing thread is to be delivered from the first register file cell to an input of a first functional unit of a plurality of functional units; and
routing the portion of the first operand to the input of the first functional unit using a first router within the first register file cell.

20. A method according to claim 19, comprising:
determining that a portion of a second operand of an instruction of a second processing thread is to be delivered from the first register file cell to an input of a second functional unit of the plurality of functional units; and
routing the portion of the second operand to the input of the second functional unit using the first router within the first register file cell.

21. A method according to claim 20, wherein routing the portion of the first operand to the input of the first functional unit and routing the portion of the second operand to the input of the second functional unit are performed substantially simultaneously.

22. A method according to claim 20, further comprising:
storing different respective portions of the operands corresponding to the plurality of processing threads within respective storage cells of a second register file cell;
determining that a different portion of the first operand of the instruction of the first processing thread is to be delivered from the second register file cell to the input of the first functional unit of the plurality of functional units; and
routing the different portion of the first operand to the input of the first functional unit using a second router within the second register file cell.

23. A method according to claim 22, wherein the portion of the first operand stored in the first register file cell is a first bit of the first operand; and
wherein the different portion of the first operand stored in the second register file cell is a second bit of the first operand.

24. A method according to claim 19, wherein routing the portion of the first operand to the input of the first functional unit includes coupling a storage cell of the first register file cell that stores the portion of the first operand to the input of the first functional unit.

25. A method according to claim 19, wherein routing the portion of the first operand to the input of the first functional unit includes:
using a primary switch to route the portion of the first operand to an input of a selected secondary switch of a plurality of secondary switches; and
using the selected secondary switch to route the portion of the first operand to the input of the first functional unit.

26. A method according to claim 25, wherein routing the portion of the first operand to the input of the first functional unit includes using the primary switch to route the portion of the first operand to a selected input of a plurality of inputs of the selected secondary switch.

\* \* \* \* \*